United States Patent
Kondo et al.

(10) Patent No.: US 12,427,787 B2
(45) Date of Patent: Sep. 30, 2025

(54) IMAGE PROCESSING DEVICE, IMAGE FORMING APPARATUS, IMAGE PROCESSING METHOD, AND NON-TRANSITORY RECORDING MEDIUM

(71) Applicants: Paru Kondo, Kanagawa (JP); Hiroaki Fukuda, Kanagawa (JP); Dai Kurabayashi, Kanagawa (JP); Takuroh Sawada, Kanagawa (JP)

(72) Inventors: Paru Kondo, Kanagawa (JP); Hiroaki Fukuda, Kanagawa (JP); Dai Kurabayashi, Kanagawa (JP); Takuroh Sawada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 204 days.

(21) Appl. No.: 18/468,973

(22) Filed: Sep. 18, 2023

(65) Prior Publication Data
US 2024/0109335 A1 Apr. 4, 2024

(30) Foreign Application Priority Data
Oct. 4, 2022 (JP) .................... 2022-160557

(51) Int. Cl.
*B41J 29/393* (2006.01)
*B41J 2/21* (2006.01)
(Continued)

(52) U.S. Cl.
CPC ........ *B41J 2/2146* (2013.01); *G06K 15/1878* (2013.01); *G06K 15/408* (2013.01)

(58) Field of Classification Search
CPC . B41J 2/2146; B41J 29/393; B41J 2029/3932
See application file for complete search history.

(56) References Cited

U.S. PATENT DOCUMENTS

| | | | |
|---|---|---|---|
| 2022/0032647 A1* | 2/2022 | Ohara | B41J 2/2142 |
| 2022/0288946 A1* | 9/2022 | Rotman | B41J 2/2146 |

(Continued)

FOREIGN PATENT DOCUMENTS

| | | |
|---|---|---|
| JP | 2005-051361 A | 2/2005 |
| JP | 2008-099129 A | 4/2008 |
| JP | 2017-220791 A | 12/2017 |

*Primary Examiner* — Scott A Richmond
(74) *Attorney, Agent, or Firm* — Harness, Dickey & Pierce, P.L.C.

(57) ABSTRACT

An image processing device includes: a first contamination detection circuit to detect contamination on an image reading device using a first relative threshold value calculated from a standard deviation of pixel values of a same-density region in a read image obtained by the image reading device, the image reading device reading a reference image formed on a recording medium by a line head including a plurality of inkjet heads and that has density regions of a plurality of gradations; a second contamination detection circuit to detect contamination on the image reading device using a second relative threshold value calculated from a standard deviation of pixel values of an area in the read image, the area being divided for each of the plurality of inkjet heads; and a contamination processing circuit to eliminate an influence of the contamination on the read image when at least one of the first contamination detection circuit or the second contamination detection circuit determines the contamination.

8 Claims, 7 Drawing Sheets

(51) Int. Cl.
   *G06K 15/00*   (2006.01)
   *G06K 15/02*   (2006.01)

(56) References Cited

U.S. PATENT DOCUMENTS

2023/0062675 A1\* 3/2023 Kazumi ................ G06F 3/1256
2023/0130174 A1   4/2023 Kondo \* cited by examiner

SHEET CONVEYANCE DIRECTION

IMAGE PROCESSING DEVICE, IMAGE FORMING APPARATUS, IMAGE PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-160557, filed on Oct. 4, 2022, in the Japan Patent Office, the entire disclosure of which is hereby incorporated by reference herein.

BACKGROUND

Technical Field

The present disclosure relates to an image processing device, an image forming apparatus, an image processing method, and a non-transitory recording medium.

Related Art

A technique of an image reading device is disclosed. The technique replaces a pixel value of white contamination or black contamination detected using a predetermined threshold value, with another pixel value to eliminate the influence of the contamination on a read image.

However, according to the technique of related art, since the threshold value is an absolute value, contamination is not sufficiently detected in some cases depending on the determined value.

SUMMARY

Example embodiments include an image processing device including a first contamination detection circuit to detect contamination on an image reading device using a first relative threshold value calculated from a standard deviation of pixel values of a same-density region in a read image obtained by the image reading device, the image reading device reading a reference image formed on a recording medium by a line head including a plurality of inkjet heads and that has density regions of a plurality of gradations; a second contamination detection circuit to detect contamination on the image reading device using a second relative threshold value calculated from a standard deviation of pixel values of an area in the read image, the area being divided for each of the plurality of inkjet heads; and a contamination processing circuit to eliminate an influence of the contamination on the read image when at least one of the first contamination detection circuit or the second contamination detection circuit determines the contamination.

Example embodiments include an image processing method including first detecting contamination on an image reading device using a first relative threshold value calculated from a standard deviation of pixel values of a same-density region in a read image obtained by the image reading device, the image reading device reading a reference image formed on a recording medium by a line head including a plurality of inkjet heads and that has density regions of a plurality of gradations; second detecting contamination on the image reading device using a second relative threshold value calculated from a standard deviation of pixel values of an area in the read image, the area being divided for each of the plurality of inkjet heads; and eliminating an influence of the contamination on the read image when at least one of the first detecting and the second detecting determines the contamination.

Example embodiments include a non-transitory recording medium storing a plurality of instructions which, when executed by one or more processors, causes the processors to perform an image processing method, the method including first detecting contamination on an image reading device using a first relative threshold value calculated from a standard deviation of pixel values of a same-density region in a read image obtained by the image reading device, the image reading device reading a reference image formed on a recording medium by a line head including a plurality of inkjet heads and that has density regions of a plurality of gradations; second detecting contamination on the image reading device using a second relative threshold value calculated from a standard deviation of pixel values of an area in the read image, the area being divided for each of the plurality of inkjet heads; and eliminating an influence of the contamination on the read image when at least one of the first detecting and the second detecting determines the contamination.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

Hereinafter, embodiments of an image processing device, an image forming apparatus, an image processing method, and a non-transitory recording medium will be described in detail referring to the accompanying drawings.

Figure 1:
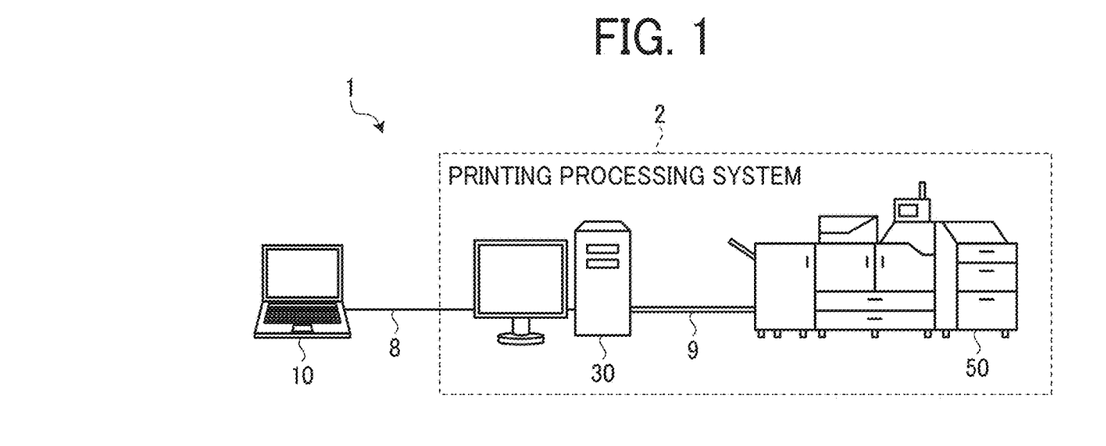
FIG. 1 is a diagram illustrating an example of a system configuration of a printing system according to an embodiment.

FIG. 1 is a diagram illustrating an example of a system configuration of a printing system 1 according to an embodiment.

As illustrated in FIG. 1, the printing system 1 includes a communication terminal 10 and a printing processing system 2. The printing system 1 is an example of an image forming system. The printing processing system 2 includes a printing control apparatus 30 such as a digital front end (DFE) server and a printing apparatus 50. The printing processing system 2 is an example of an image formation processing system.

The communication terminal 10 and the printing control apparatus 30 are communicably connected with each other via a first communication network such as a local area network (LAN) 8. The printing control apparatus 30 and the printing apparatus 50 are communicably connected with each other via a second communication network such as a dedicated line 9. In the following description, an inkjet printing system 1, in particular, a production printing system will be described as a specific example, but embodiments of the present disclosure can be applied to other types of printing systems.

The communication terminal 10 is a personal computer (PC) for viewing and editing printing data that is an example of image formation target data.

The printing control apparatus 30 is a server computer. The printing control apparatus 30 generates bitmap data for printing based on the printing data transmitted from the communication terminal 10 and transmits the generated bitmap data and a printing instruction to the printing apparatus 50. The printing control apparatus 30 is an example of an image formation control apparatus.

The printing apparatus 50 prints an image on a printing sheet based on the bitmap data transmitted from the printing control apparatus 30. The printing apparatus 50 is an example of an image forming apparatus.

Although FIG. 1 illustrates the example of the printing system 1 including one communication terminal 10, one printing control apparatus 30, and one printing apparatus 50, but embodiments of the present disclosure are not limited thereto. For example, in the printing system 1, the number of, at least one of, the communication terminal 10, the printing control apparatus 30, and the printing apparatus 50 can be a plural number. In the example described below, the printing processing system 2 includes the printing control apparatus 30 and the printing apparatus 50. However, a function implemented by the printing control apparatus 30 can be implemented by the printing apparatus 50 so that the printing processing system 2 includes only the printing apparatus 50.

The printing apparatus 50 is described next. The printing apparatus 50 of the present embodiment is an inkjet printer using a line head.

Figure 2:
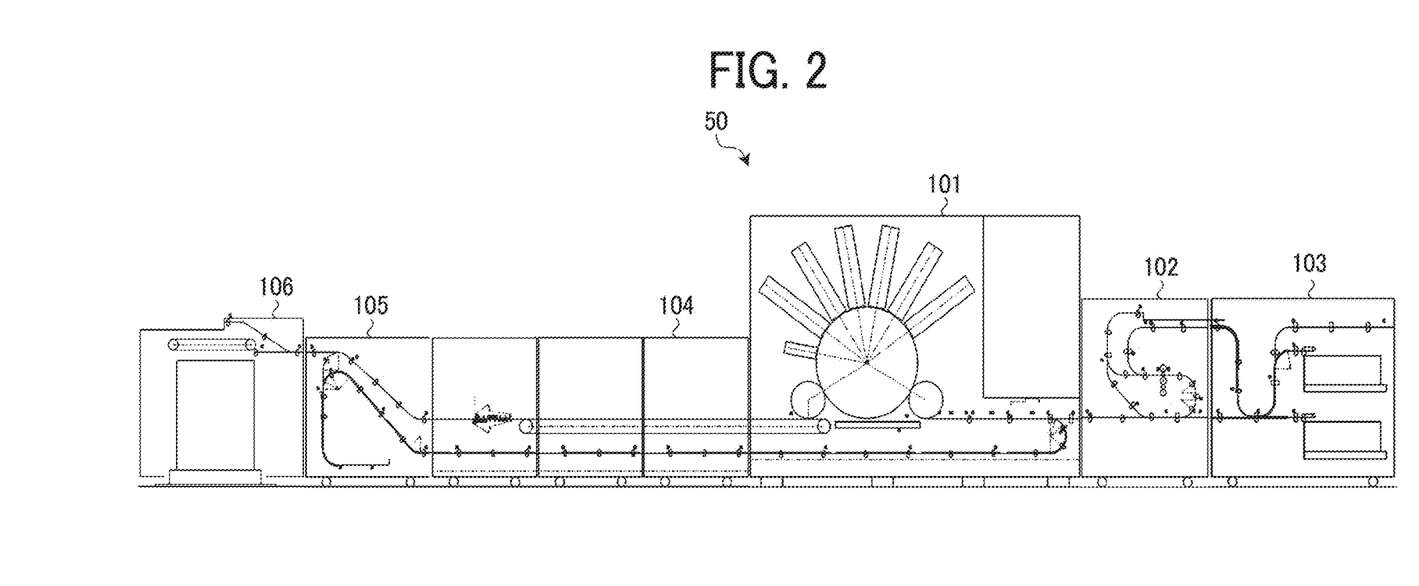
FIG. 2 is a view illustrating an example of a configuration of a printing apparatus.

FIG. 2 is a view illustrating an example of a configuration of the printing apparatus 50. As illustrated in FIG. 2, the printing apparatus 50 according to the present embodiment includes an image forming unit 101, a pre-coating unit 102, a sheet feeding unit 103, a drying and cooling unit 104, an inversion unit 105, and a sheet ejection unit 106.

The sheet feeding unit 103 conveys a recording medium such as cut paper to, for example, the image forming unit 101 (described later). In some cases, ink is less likely to be fixed depending on the type of the recording medium. Thus, the pre-coating unit 102 applies a pre-coating liquid to the recording medium to facilitate fixing of the ink. The image forming unit 101 (an example of an image forming device) places the recording medium around a drum and forms an image on the recording medium placed around the drum using the line head.

The drying and cooling unit 104 dries the image formed by the image forming unit 101 and fixes the image to the recording medium. When an image is also formed on the back side of the recording medium, the inversion unit 105 reverses a conveyance direction of the recording medium conveyed from the drying and cooling unit 104, and then conveys the recording medium to the image forming unit 101 again. The sheet ejection unit 106 stacks the recording medium with the image fixed by the drying and cooling unit 104. According to the present embodiment, an example is described in which the printing apparatus 50 forms an image on cut paper; however, the recording medium on which an image is formed is not limited to the example, and an image can be similarly formed on roll paper.

Figure 3:
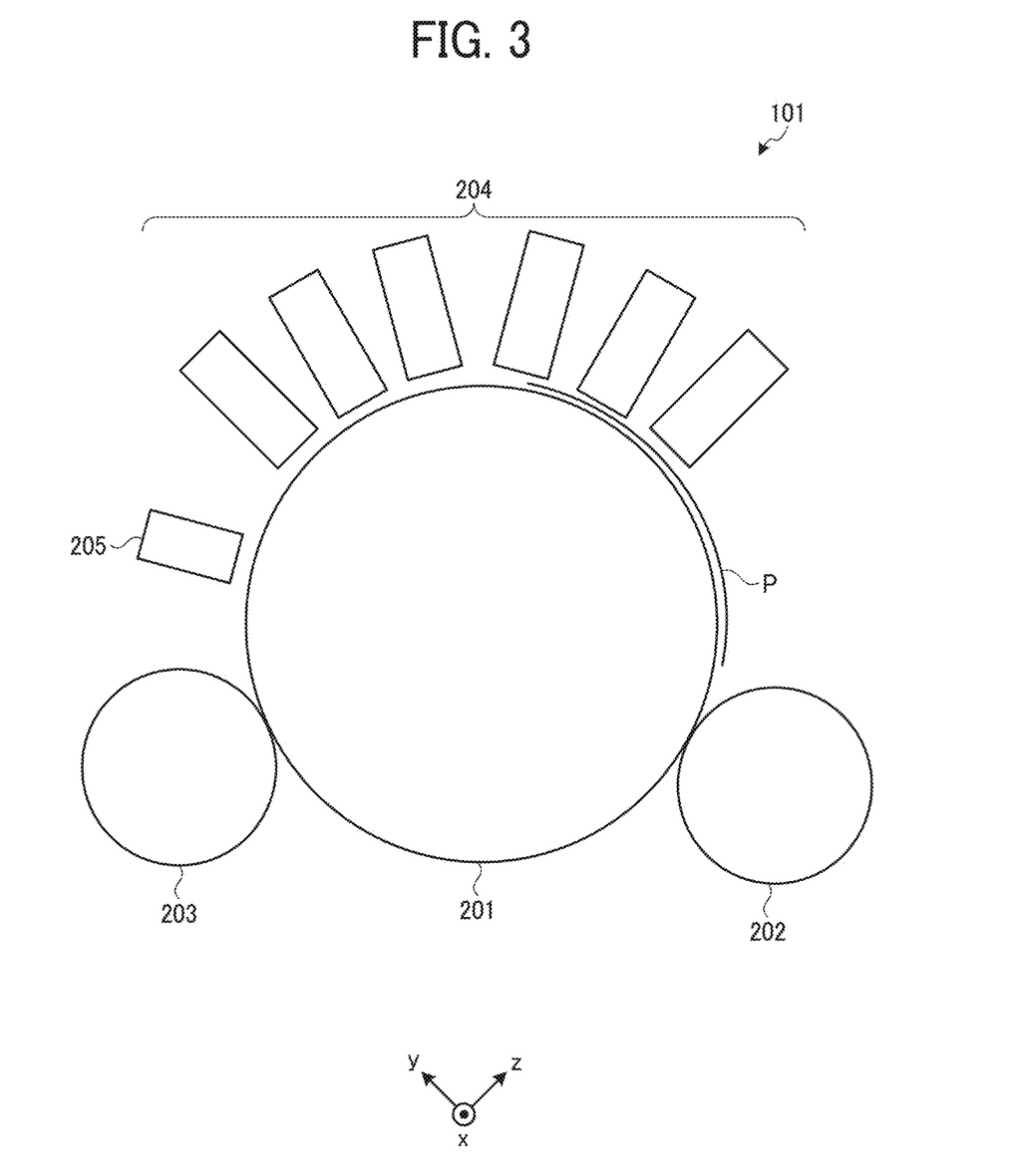
FIG. 3 is a view illustrating an example of a configuration of an image forming unit included in the printing apparatus.

FIG. 3 illustrates an example of a configuration of the image forming unit 101 included in the printing apparatus 50. Referring to FIG. 3, it is assumed that an x-axis direction is a main-scanning direction, a y-axis direction is a sub-scanning direction, and a z-axis direction corresponds to upward and downward directions of the image forming unit 101. As illustrated in FIG. 3, the image forming unit 101 includes a drum 201, an entrance cylinder 202, an exit cylinder 203, line heads 204, and an inline sensor 205 (an example of an image reading device). The drum 201, the entrance cylinder 202, and the exit cylinder 203 rotate in synchronization with each other at a predetermined speed, and convey a recording medium P conveyed into the image forming unit 101. The recording medium P is conveyed in the image forming unit 101 while the holder of the recording medium P is changed in the order of the entrance cylinder 202, the drum 201, and the exit cylinder 203.

The drum 201 performs attraction conveyance that attracts and conveys the recording medium P on the surface of the drum 201. The line heads 204 of respective colors are disposed in a rotation direction of the drum 201, and form images on the recording medium P attracted to the surface of the drum 201. According to the present embodiment, the line heads 204 of six colors including black (K), cyan (C), magenta (M), and yellow (Y) are disposed in the rotation direction of the drum 201. The inline sensor 205 reads the images formed on the recording medium P by the line heads 204.

The exit cylinder 203 separates the recording medium P from the drum 201 and ejects the recording medium P to the drying and cooling unit 104.

Figure 4:
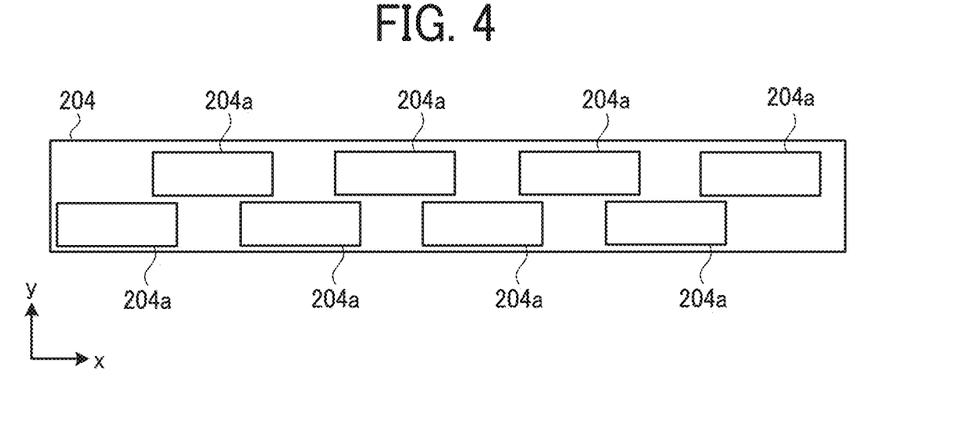
FIG. 4 is a view illustrating an example arrangement of inkjet heads in a line head included in the printing apparatus.

FIG. 4 illustrates an example arrangement of inkjet heads in a line head included in the printing apparatus 50. Referring to FIG. 4, it is assumed that the x-axis direction is the main-scanning direction and the y-axis direction is the sub-scanning direction. The line head 204 of each color includes a plurality of inkjet heads 204a arranged in a staggered manner in the x-axis direction. Thus, an image can be formed in the main-scanning direction of the recording medium P without moving the line head 204 in the x-axis direction, thereby increasing the speed of forming an image on the recording medium P.

However, since the plurality of inkjet heads 204a are arranged in a staggered manner in the x-axis direction, the physical positions of the inkjet heads 204a are shifted in the y-axis direction. Thus, the inkjet heads 204a located at the different physical positions in the y-axis direction have timings at which images are formed on the recording medium P (in other words, timings of discharging ink to the recording medium P) shifted from each other so that the positions at which the images are formed on the recording medium P coincide with each other in the y-axis direction. The plurality of inkjet heads 204a are arranged so that the positions at which the images are formed on the recording medium P overlap each other in the x-axis direction. Thus, even when the inkjet heads 204a are driven under the same conditions in the printing apparatus 50, unevenness in density occurs at the positions at which the plurality of inkjet heads 204a form the images in a manner overlapping each other in the x-axis direction. Furthermore, the inkjet heads 204a have variations in manufacturing even in units of nozzles of ink included in the inkjet heads 204a, and hence have differences in discharge characteristics of ink from the nozzles. Thus, unevenness in density may occur also in an image formed on the recording medium P by the same inkjet head 204a. Therefore, the printing apparatus 50 according to the present embodiment executes density equalization processing of correcting unevenness in density of the entire image formed on the recording medium P in the x-axis direction.

According to the present embodiment, the printing apparatus 50 controls the line head 204 to form an adjustment chart C (see FIG. 5) set in advance and used for the density equalization processing on the recording medium P.

Figure 5:
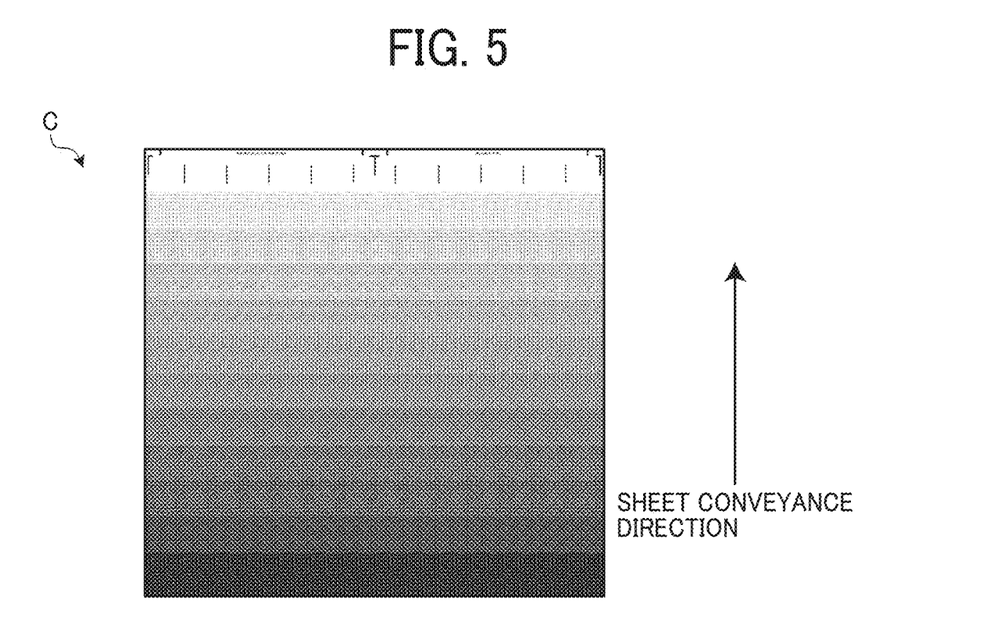
FIG. 5 is a view illustrating an example of an adjustment chart used for density equalization processing.

FIG. 5 is a view illustrating an example of the adjustment chart C used for the density equalization processing. As illustrated in FIG. 5, the adjustment chart C used for the density equalization processing is, for example, an image having density regions of a plurality of gradations set in advance. As illustrated in FIG. 5, the adjustment chart C has a density region having the same density formed in a direction orthogonal to the conveyance direction of the recording medium P.

Then, the printing apparatus 50 controls the inline sensor 205 to read the adjustment chart C formed on the recording medium P. The printing apparatus 50 detects unevenness in density of the adjustment chart C in the x-axis direction based on the read result of the adjustment chart C, and controls the discharge of the ink from the inkjet heads 204a based on the detected unevenness in density to keep the density of the image in the x-axis direction constant.

Figure 6:
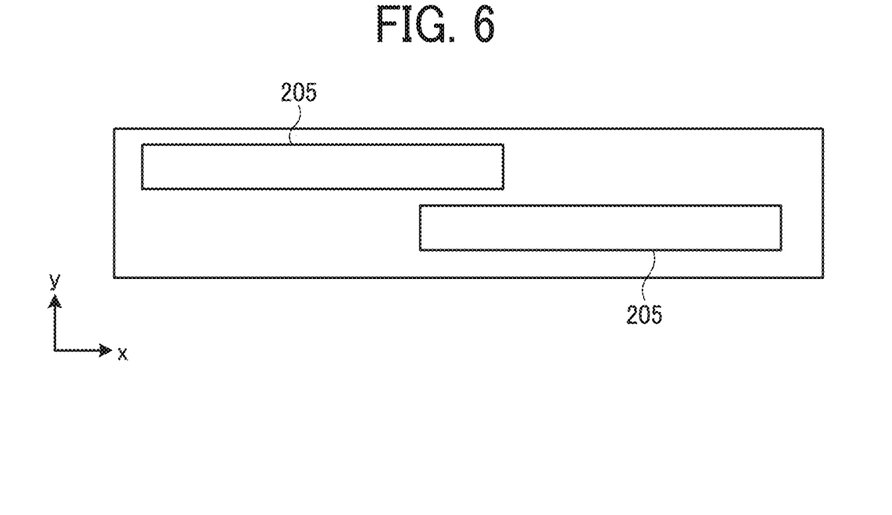
FIG. 6 is a view illustrating an example of a configuration of an inline sensor included in the printing apparatus.

FIG. 6 illustrates an example of a configuration of the inline sensor 205 included in the printing apparatus 50.

When the line head 204 has a size to form an image on a recording medium large in the x-axis direction (for example, a recording medium having a sheet width of A2 or larger), the inline sensor 205 is also desired to have a size to read an adjustment chart C formed on the recording medium P large in the x-axis direction. As illustrated in FIG. 6, the printing apparatus 50 includes a plurality of inline sensors 205 arranged in the x-axis direction to read the adjustment chart C formed on the recording medium P large in the x-axis direction. The plurality of inline sensors 205 are arranged in a staggered manner in the x-axis direction. Thus, the positions of the plurality of inline sensors 205 are shifted in the y-axis direction.

A hardware configuration of the printing apparatus 50 is described next.

Figure 7:
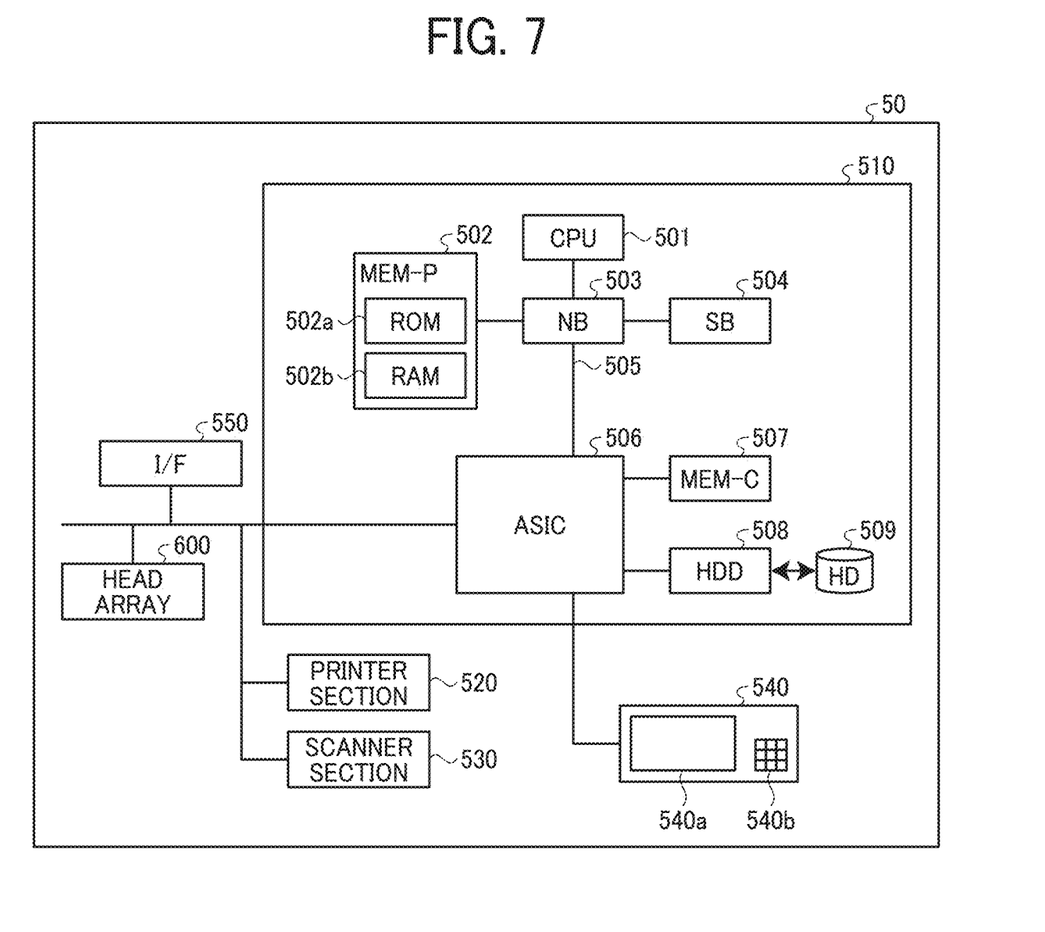
FIG. 7 is a diagram illustrating an example of a hardware configuration of the printing apparatus.

FIG. 7 is a diagram illustrating an example of a hardware configuration of the printing apparatus 50. The hardware configuration illustrated in FIG. 7 can be the same among different embodiments. Alternatively, an element can be added thereto or deleted therefrom as desired.

As illustrated in FIG. 7, the printing apparatus 50 includes a controller 510 (an example of an image processing device), a printer section 520, a scanner section 530, an operation panel 540, an interface (I/F) 550, and a head array 600.

The printer section 520 and the scanner section 530 are mechanisms to execute image formation processing in the printing apparatus 50. The printer section 520 is the above-described image forming unit 101. The scanner section 530 is the above-described inline sensor 205.

The operation panel 540 includes a panel display 540a, such as a touch panel, and an input section 540b. The panel display 540a displays current set values and selection screens and accepts an input from a user (an operator). The input section 540b includes a numeric keypad for accepting setting values of conditions (for example, density setting conditions) related to image formation, a start key for accepting a copy start instruction, and the like. The controller 510 controls the entire operation of the printing apparatus 50. For example, the controller 510 controls drawing, communication, input from the operation panel 540, and the like.

The head array 600 is the line head 204 provided with the plurality of inkjet heads 204a as illustrated in FIG. 4.

The controller 510 includes a central processing unit (CPU) 501 that is a major part of a computer, a system memory (MEM-P) 502, a northbridge (NB) 503, a southbridge (SB) 504, an application specific integrated circuit (ASIC) 506, a local memory (MEM-C) 507 that is a memory, a hard disk drive (HDD) 508, and a hard disk (HD) 509 that is a memory. In the controller 510, the NB 503 and the ASIC 506 are connected via an Accelerated Graphics Port (AGP) bus 505.

The CPU 501 is a controller that controls the entire operation of the printing apparatus 50. The NB 503 is a bridge for connecting the CPU 501 to the MEM-P 502, the SB 504, and the AGP bus 505. The NB 503 includes a memory controller for controlling reading or writing of various data from or to the MEM-P 502, a Peripheral Component Interconnect (PCI) master, and an AGP target.

The MEM-P 502 includes a read-only memory (ROM) 502a as a memory that stores a program and data for implementing various functions of the controller 510. The MEM-P 502 further includes a random-access memory (RAM) 502b that is used as, for example, a memory in which the program or data is loaded, and a drawing memory that stores drawing data for printing. The program stored in the RAM 502b may be stored in any computer-readable recording medium, such as a compact disc-read only memory (CD-ROM), flexible disk (FD), compact discrecordable (CD-R), or digital versatile disc (DVD), in an installable or executable file format and provided.

The program to be executed by the printing apparatus 50 according to the present embodiment may be stored in a computer connected to a network such as the Internet and provided by being downloaded via the network. The program to be executed by the printing apparatus 50 according to the present embodiment may be provided or distributed via a network such as the Internet.

The SB 504 is a bridge for connecting the NB 503 to a PCI device or a peripheral device.

The ASIC 506 is an integrated circuit (IC) dedicated to image processing and includes hardware elements for image processing. The ASIC 506 serves as a bridge for connecting the AGP bus 505, a PCI bus, the HDD 508, and the MEM-C 507 to each other. The ASIC 506 includes a PCI target, an AGP master, an arbiter (ARB) as a central processor of the ASIC 506, a memory controller, a plurality of direct memory access controllers (DMACs), and a PCI unit. The memory controller controls the MEM-C 507. The DMACs, for example, rotate image data with a hardware logic or the like. The PCI unit transfers data with respect to the printer section 520 and the scanner section 530 through the PCI bus. The ASIC 506 may connect to a Universal Serial Bus (USB) interface (I/F), an interface of the Institute of Electrical and Electronics Engineers 1394 (IEEE1394), or both.

The MEM-C 507 is a local memory used as a buffer for image data to be copied or a code buffer. The HD 509 stores various image data, font data for printing, and form data. The HDD 508 controls reading or writing of various data from or to the HD 509 under the control by the CPU 501. The AGP bus 505 is a bus interface for a graphics accelerator card, which has been proposed to accelerate graphics processing. The AGP bus 505 can speed up the graphics accelerator card by directly accessing the MEM-P 502 with high throughput.

Characteristic functions of the printing apparatus 50 of the printing system 1 according to the present embodiment are described next.

Figure 8:
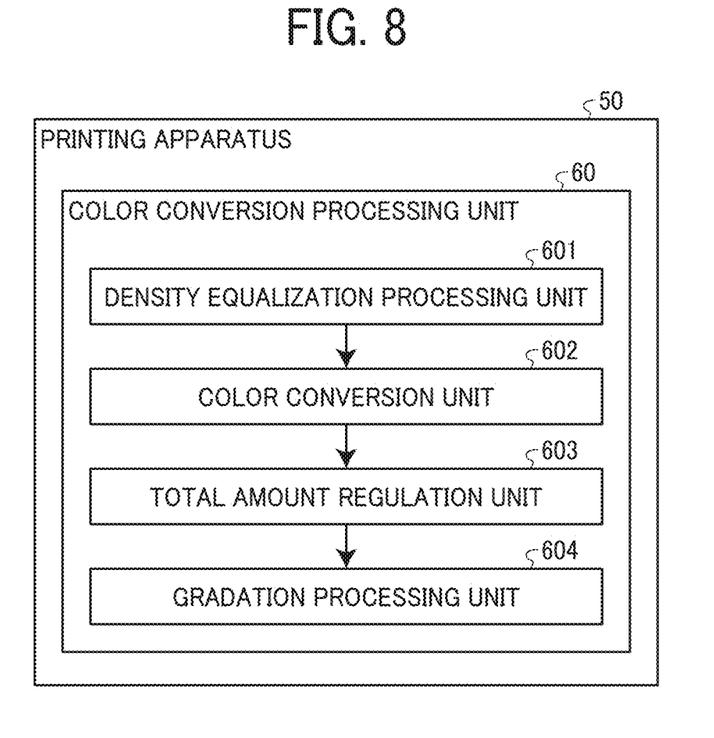
FIG. 8 is a functional block diagram illustrating an example of a functional configuration of the printing apparatus.

FIG. 8 is a functional block diagram illustrating an example of a functional configuration of the printing apparatus 50. As illustrated in FIG. 8, the ASIC 506 of the controller 510 of the printing apparatus 50 includes a color conversion processing unit 60. The color conversion processing unit 60 may be implemented by the CPU 501 operating in accordance with a program.

The color conversion processing unit 60 performs, for example, color conversion processing on color information in the RGB format of a drawing command received from the printing control apparatus 30 into color information (for example, CMYK) suitable for the printing apparatus 50.

As illustrated in FIG. 8, the color conversion processing unit 60 includes a density equalization processing unit 601, a color conversion unit 602, a total amount regulation unit 603, and a gradation processing unit 604.

An image read by the inline sensor 205 is transmitted to the density equalization processing unit 601. The density equalization processing unit 601 executes density equalization processing of correcting unevenness in density of the entire image formed on the recording medium P based on bitmap data received from the printing control apparatus 30. In addition, the density equalization processing unit 601 uses an image obtained by reading the adjustment chart C in the above-described density equalization processing to detect black contamination and white contamination on the inline sensor 205, and hence executes contamination detection processing of detecting contamination on the inline sensor 205 as part of image processing.

The color conversion unit 602 performs color conversion processing based on the bitmap data received from the printing control apparatus 30. For example, the color conversion unit 602 converts color data in a color space of RGB into color data in a color space of CMY (C color data, M color data, and Y color data), and further converts the color data into color data of CMYK by black processing. Accordingly, the color conversion unit 602 obtains color data of each of CMYK (C color data, M color data, Y color data, and K color data). Then, the color conversion unit 602 outputs the converted color data of CMYK to the total amount regulation unit 603.

The total amount regulation unit 603 performs total amount regulation processing using the color data of each of CMYK (C color data, M color data, Y color data, and K color data). The total amount regulation unit 603 corrects the color data of each of CMYK (C color data, M color data, Y color data, and K color data) so that the total amount of color materials on a medium is a limit value or less.

After the total amount is regulated, the gradation processing unit 604 executes gradation processing in accordance with the format of the printing apparatus 50 to generate print data.

Contamination detection processing by the density equalization processing unit 601 is described next.

Figure 9:
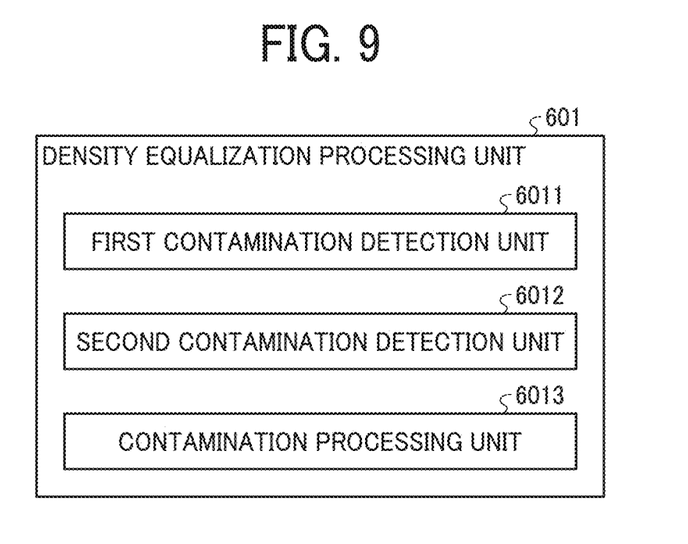
FIG. 9 is a block diagram illustrating an example of a functional configuration related to contamination detection processing of a density equalization processing unit.

A functional configuration related to the contamination detection processing of the density equalization processing unit 601 is described. FIG. 9 is a block diagram illustrating an example of a functional configuration related to the contamination detection processing of the density equalization processing unit 601. As illustrated in FIG. 9, the density equalization processing unit 601 includes a first contamination detection unit 6011, a second contamination detection unit 6012, and a contamination processing unit 6013 as functions related to the contamination detection processing. As described above, each of the functions is implemented by the ASIC 506 or the CPU 501 operating in accordance with a program.

Figure 10:
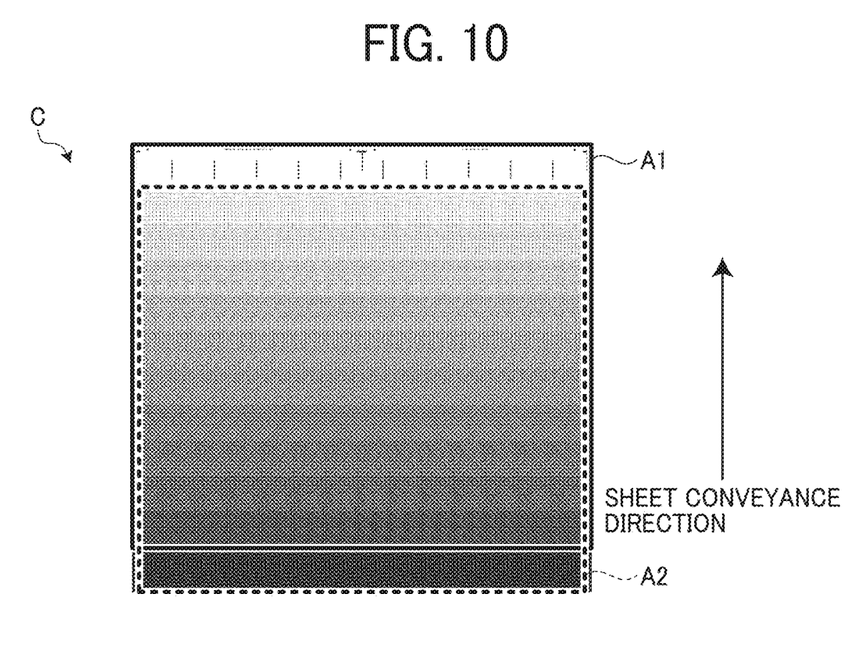
FIG. 10 is a view illustrating an example of contamination detectable ranges of an image by a first contamination detection unit and a second contamination detection unit.

FIG. 10 is a view illustrating an example of contamination detectable ranges of an image by the first contamination detection unit 6011 and the second contamination detection unit 6012. As illustrated in FIG. 10, the first contamination detection unit 6011 and the second contamination detection unit 6012 define a range A1 for a detectable range in which black contamination of an image obtained by reading the adjustment chart C can be detected. The detectable range for black contamination is limited because the difference between the pixel value of a black contamination portion and the pixel value of a maximum density portion is small and cannot be discriminated.

In contrast, as illustrated in FIG. 10, the first contamination detection unit 6011 and the second contamination detection unit 6012 define a range A2 for a detectable range in which white contamination of the image obtained by reading the adjustment chart C can be detected. The detectable range for white contamination is limited because the difference between the pixel value of a white contamination portion and the pixel value of a paper white portion on the recording medium P is small and cannot be discriminated.

The first contamination detection unit 6011 detects contamination in the same-density region. More specifically, the first contamination detection unit 6011 calculates a threshold value (that is, a first relative threshold value) from the standard deviation of pixel values of each same-density region, and determines whether each pixel value has contamination.

Figure 11:
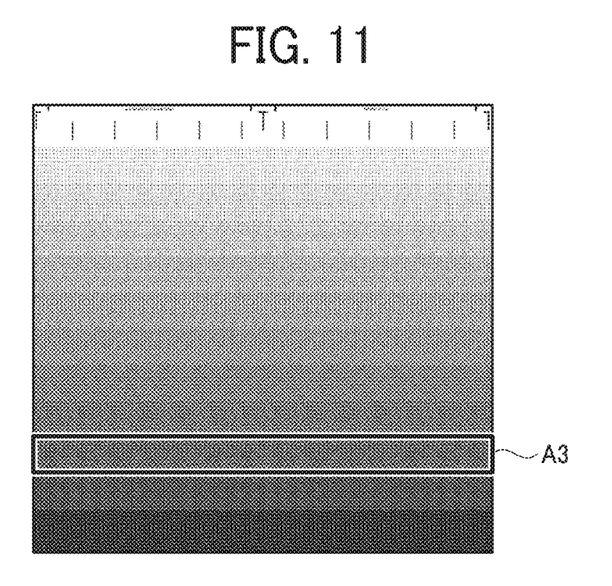
FIG. 11 is a view illustrating an example of a calculation range for the standard deviation of pixel values by the first contamination detection unit.

FIG. 11 is a view illustrating an example of a calculation range for the standard deviation of pixel values by the first contamination detection unit 6011. As described above, the first contamination detection unit 6011 calculates the standard deviation of pixel values per same-density region as surrounded by a range A3 illustrated in FIG. 11. The standard deviation of the pixel values is calculated per same-density region to change the threshold value depending on the density. To deal with any contamination on the inline sensor 205, the density of contamination is not absolutely determined. Thus, according to the present embodiment, since the density determined as contamination varies depending on the density region, threshold values are calculated from different standard deviations.

For example, the threshold value for determining white contamination is a value obtained by adding a value, which is obtained by multiplying the standard deviation of pixel values calculated per same-density region by a predetermined coefficient, to the average value of the pixel values. For example, the threshold value for determining black contamination is a value obtained by subtracting a value, which is obtained by multiplying the standard deviation of pixel values calculated per same-density region by a predetermined coefficient, from the average value of the pixel values.

The first contamination detection unit 6011 compares the threshold value for determining white contamination with each pixel value, and determines a value larger than the threshold value as white contamination. The first contamination detection unit 6011 compares the threshold value for determining black contamination with each pixel value, and determines a value smaller than the threshold value for determining black contamination as black contamination.

Figure 12:
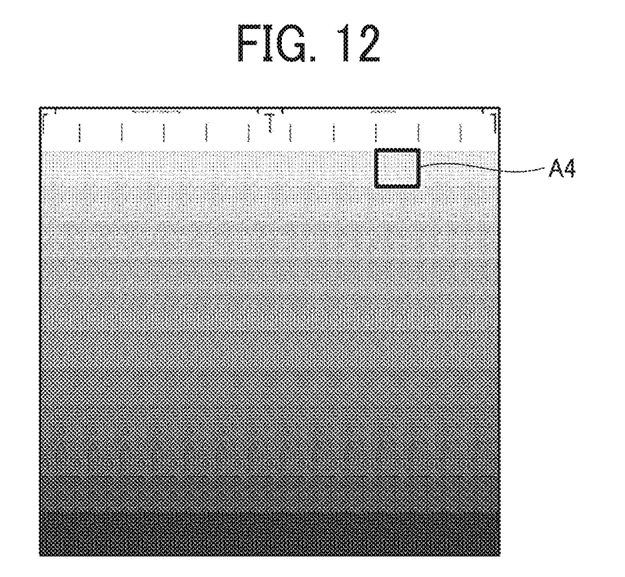
FIG. 12 is a view illustrating an example of a calculation range for the standard deviation of pixel values by the second contamination detection unit.

The second contamination detection unit 6012 detects contamination in an area divided for each of the plurality of inkjet heads 204a. More specifically, the second contamination detection unit 6012 calculates a threshold value (that is, a second relative threshold value) from the standard deviation of pixel values of an area divided for each of the plurality of inkjet heads 204a, and determines whether each pixel value has contamination.

FIG. 12 is a view illustrating an example of a calculation range for the standard deviation of pixel values by the second contamination detection unit 6012. As described above, the second contamination detection unit 6012 calculates the standard deviation of pixel values per area divided for each inkjet head 204a as surrounded by a range A4 illustrated in FIG. 12. The standard deviation of the pixel values is calculated per area divided for each inkjet head 204a to detect contamination that is not determined as contamination in the same-density region. Since the discharge characteristics of ink differ depending on the inkjet head 204a, variations in density occur depending on the inkjet head 204a. That is, the density in the same-density region in the range A4 illustrated in FIG. 12 is not exactly the same density in some cases. Thus, according to the present embodiment, since the threshold value is changed depending on the density, the threshold value is calculated from the standard deviation of different pixel values even for each area divided for each inkjet head 204a.

For example, it is assumed that the threshold value for determining white contamination is a value obtained by adding a value, which is obtained by multiplying the standard deviation of pixel values calculated per area divided for each inkjet head 204a by a predetermined coefficient, to the average value of the pixel values. In contrast, for example, it is assumed that the threshold value for determining black contamination is a value obtained by subtracting a value, which is obtained by multiplying the standard deviation of pixel values calculated per area divided for each inkjet head 204a by a predetermined coefficient, from the average value of the pixel values.

That is, according to the present embodiment, in the first contamination detection unit 6011 and the second contamination detection unit 6012, the threshold values (for example, the first relative threshold value and the second relative threshold value) are relatively set in accordance with the degree of contamination, and can respond to any contamination on the inline sensor 205.

The second contamination detection unit 6012 compares the threshold value for determining white contamination with each pixel value, and determines a value larger than the threshold value as white contamination. The second contamination detection unit 6012 compares the threshold value for determining black contamination with each pixel value, and determines a value smaller than the threshold value for determining black contamination as black contamination.

The contamination processing unit 6013 replaces the pixel value determined as having contamination by at least one of the first contamination detection unit 6011 and the second contamination detection unit 6012 with an average pixel value that is a pixel value not having the contamination. Accordingly, the contamination processing unit 6013 ignores the presence of the contamination on the inline sensor 205, and can implement image processing with high accuracy without cleaning the inline sensor 205. In this case, the average pixel value is an average value of pixel values determined as not having the contamination, and is calculated per same-density region or per area divided for each inkjet head 204a.

A flow of contamination detection processing by the density equalization processing unit 601 is described next.

Figure 13:
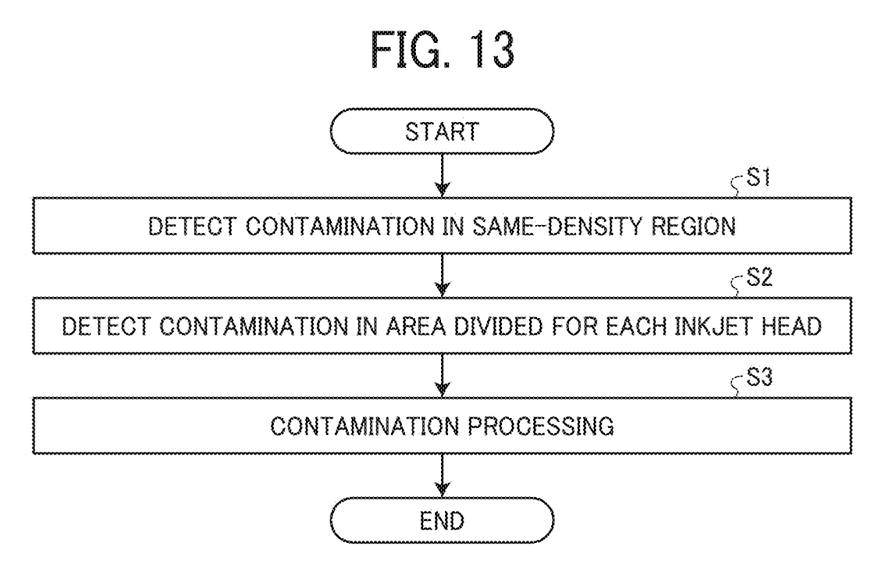
FIG. 13 is a flowchart presenting an example of a flow of the contamination detection processing by the density equalization processing unit.

FIG. 13 is a flowchart presenting an example of a flow of the contamination detection processing by the density equalization processing unit 601. As presented in FIG. 13, the first contamination detection unit 6011 detects contamination in the same-density region (step S1).

Then, the second contamination detection unit 6012 detects contamination in an area divided for each of the plurality of inkjet heads 204a (step S2).

Then, the contamination processing unit 6013 replaces a pixel value determined as having the contamination by at least one of the first contamination detection unit 6011 and the second contamination detection unit 6012 with an average pixel value (step S3).

While the second contamination detection unit 6012 performs contamination detection after the first contamination detection unit 6011 performs contamination detection according to the present embodiment, either of contamination detection by the first contamination detection unit 6011 and contamination detection by the second contamination detection unit 6012 may be performed first.

As described above, according to the present embodiment, the image read in the density equalization processing is used to detect black contamination and white contamination on the inline sensor 205 using the relative threshold values (for example, the first threshold value and the second threshold value), thereby detecting any contamination on the inline sensor 205 as part of the image processing. That is, according to the present embodiment, without feeding another sheet, any contamination on the inline sensor 205 is detected using the relative threshold values, and the influence of the contamination on the read image can be eliminated.

While the printing apparatus 50 of the disclosure is applied to the production printing system in the above-described embodiment, the disclosure can be applied to any image forming apparatus, such as a multifunction peripheral, a copier, a printer, a scanner apparatus, or a facsimile apparatus, having at least two functions of a copier function, a printer function, a scanner function, a facsimile function, and the like.

The communication terminal 10 is not limited to a PC. Examples of the communication terminal 10 include a notebook personal computer (PC), a mobile phone, a smartphone, and a tablet terminal. Examples of the communication terminal 10 further include a projector (PJ), an interactive whiteboard (IWB, a whiteboard having an interactive electronic whiteboard function), an output device of digital signage or the like, a head up display (HUD) device, an industrial machine, an image capturing device, a sound collecting device, a medical device, a network home appliance, an automobile (connected car), a game machine, a personal digital assistant (PDA), and a digital camera. The communication terminal 10 does not have to have the communication function, and may be a USB memory or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Aspects of the present disclosure are, for example, as follows.

According to a first aspect, an image processing device includes a first contamination detection unit that detects contamination on an image reading device using a first relative threshold value calculated from a standard deviation of pixel values of a same-density region in a read image obtained by the image reading device reading a reference image that is formed on a recording medium by a line head including a plurality of inkjet heads and that has density regions of a plurality of gradations; a second contamination detection unit that detects contamination on the image reading device using a second relative threshold value calculated from a standard deviation of pixel values of an area in the read image, the area being divided for each of the plurality of inkjet heads; and a contamination processing unit that eliminates an influence of the contamination on the read image when at least one of the first contamination detection unit and the second contamination detection unit determines the contamination.

According to a second aspect, in the image processing device of the first aspect, the first contamination detection unit and the second contamination detection unit detect white contamination and black contamination as the contamination on the image reading device.

According to a third aspect, in the image processing device of the first aspect or the second aspect, the contamination processing unit replaces a pixel value determined as having the contamination by at least one of the first contamination detection unit and the second contamination detection unit, with a pixel value not having the contamination.

According to a fourth aspect, in the image processing device of the third aspect, the contamination processing unit uses an average value of pixel values determined as not having the contamination as the pixel value not having the contamination.

According to a fifth aspect, in the image processing device of any one of the first aspect to the fourth aspect, the reference image is an adjustment chart that is used for density equalization processing of correcting unevenness in density of an entire image formed on the recording medium, and detection processing for the contamination on the image reading device by the first contamination detection unit and the second contamination detection unit is executed in part of the density equalization processing.

According to a sixth aspect, an image forming apparatus includes the image processing device of any one of the first aspect to the fifth aspect; and an image forming device.

According to a seventh aspect, a program causes a computer to function as a first contamination detection unit that detects contamination on an image reading device using a first relative threshold value calculated from a standard deviation of pixel values of a same-density region in a read image obtained by the image reading device reading a reference image that is formed on a recording medium by a line head including a plurality of inkjet heads and that has density regions of a plurality of gradations; a second contamination detection unit that detects contamination on the image reading device using a second relative threshold value calculated from a standard deviation of pixel values of an area in the read image, the area being divided for each of the plurality of inkjet heads; and a contamination processing unit that eliminates an influence of the contamination on the read image when at least one of the first contamination detection unit and the second contamination detection unit determines the contamination.

According to an eighth aspect, an image processing method includes a first contamination detection unit first detecting contamination on an image reading device using a first relative threshold value calculated from a standard deviation of pixel values of a same-density region in a read image obtained by the image reading device reading a reference image that is formed on a recording medium by a line head including a plurality of inkjet heads and that has density regions of a plurality of gradations; a second contamination detection unit second detecting contamination on the image reading device using a second relative threshold value calculated from a standard deviation of pixel values of an area in the read image, the area being divided for each of the plurality of inkjet heads; and a contamination processing unit eliminating an influence of the contamination on the read image when at least one of the first detecting and the second detecting determines the contamination.

The invention claimed is:

1. An image processing device comprising:
a first contamination detection circuit configured to detect contamination on an image reading device using a first relative threshold value calculated from a standard deviation of pixel values of a same-density region in a read image obtained by the image reading device, the image reading device reading a reference image formed on a recording medium by a line head including a plurality of inkjet heads and that has density regions of a plurality of gradations;
a second contamination detection circuit configured to detect contamination on the image reading device using a second relative threshold value calculated from a standard deviation of pixel values of an area in the read image, the area being divided for each of the plurality of inkjet heads; and
a contamination processing circuit configured to eliminate an influence of the contamination on the read image when at least one of the first contamination detection circuit or the second contamination detection circuit determines the contamination.

2. The image processing device according to claim 1, wherein the first contamination detection circuit and the second contamination detection circuit detect white contamination and black contamination as the contamination on the image reading device.

3. The image processing device according to claim 1, wherein the contamination processing circuit replaces a pixel value determined as having the contamination by at least one of the first contamination detection circuit or the second contamination detection circuit, with a pixel value not having the contamination.

4. The image processing device according to claim 3, wherein the contamination processing circuit uses an average value of pixel values determined as not having the contamination as the pixel value not having the contamination.

5. The image processing device according to claim 1,
wherein the reference image is an adjustment chart that is used for density equalization processing of correcting unevenness in density of an entire image formed on the recording medium, and
wherein detection processing for the contamination on the image reading device by the first contamination detection circuit and the second contamination detection circuit is executed in part of the density equalization processing.

6. An image forming apparatus comprising:
the image processing device according to claim 1; and
an image forming device including the line head.

7. An image processing method comprising:
first detecting contamination on an image reading device using a first relative threshold value calculated from a standard deviation of pixel values of a same-density region in a read image obtained by the image reading device, the image reading device reading a reference image formed on a recording medium by a line head including a plurality of inkjet heads and that has density regions of a plurality of gradations;
second detecting contamination on the image reading device using a second relative threshold value calculated from a standard deviation of pixel values of an area in the read image, the area being divided for each of the plurality of inkjet heads; and
eliminating an influence of the contamination on the read image when at least one of the first detecting or the second detecting determines the contamination.

8. A non-transitory recording medium storing a plurality of instructions which, when executed by one or more processors, causes the processors to perform an image processing method, the method comprising:
first detecting contamination on an image reading device using a first relative threshold value calculated from a standard deviation of pixel values of a same-density region in a read image obtained by the image reading device, the image reading device reading a reference image formed on a recording medium by a line head including a plurality of inkjet heads and that has density regions of a plurality of gradations;
second detecting contamination on the image reading device using a second relative threshold value calculated from a standard deviation of pixel values of an area in the read image, the area being divided for each of the plurality of inkjet heads; and
eliminating an influence of the contamination on the read image when at least one of the first detecting or the second detecting determines the contamination.

* * * * *